Nov. 29, 1955  W. C. GOSCH  2,725,449
WELDING ELECTRODE HOLDER
Filed June 8, 1953  2 Sheets-Sheet 2
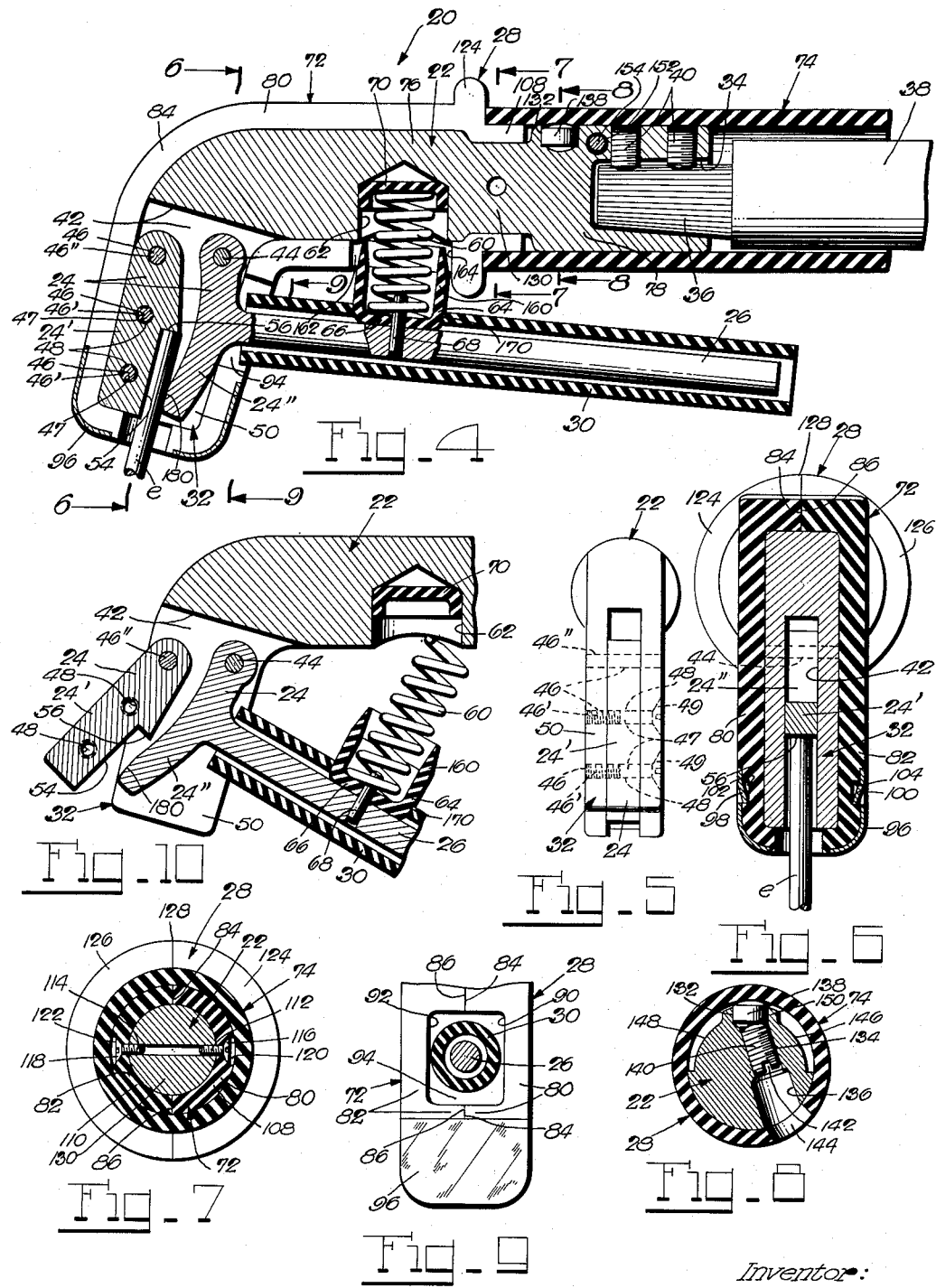
Inventor:
Winkler C. Gosch
by: Steward & Spruyel
Attorneys.

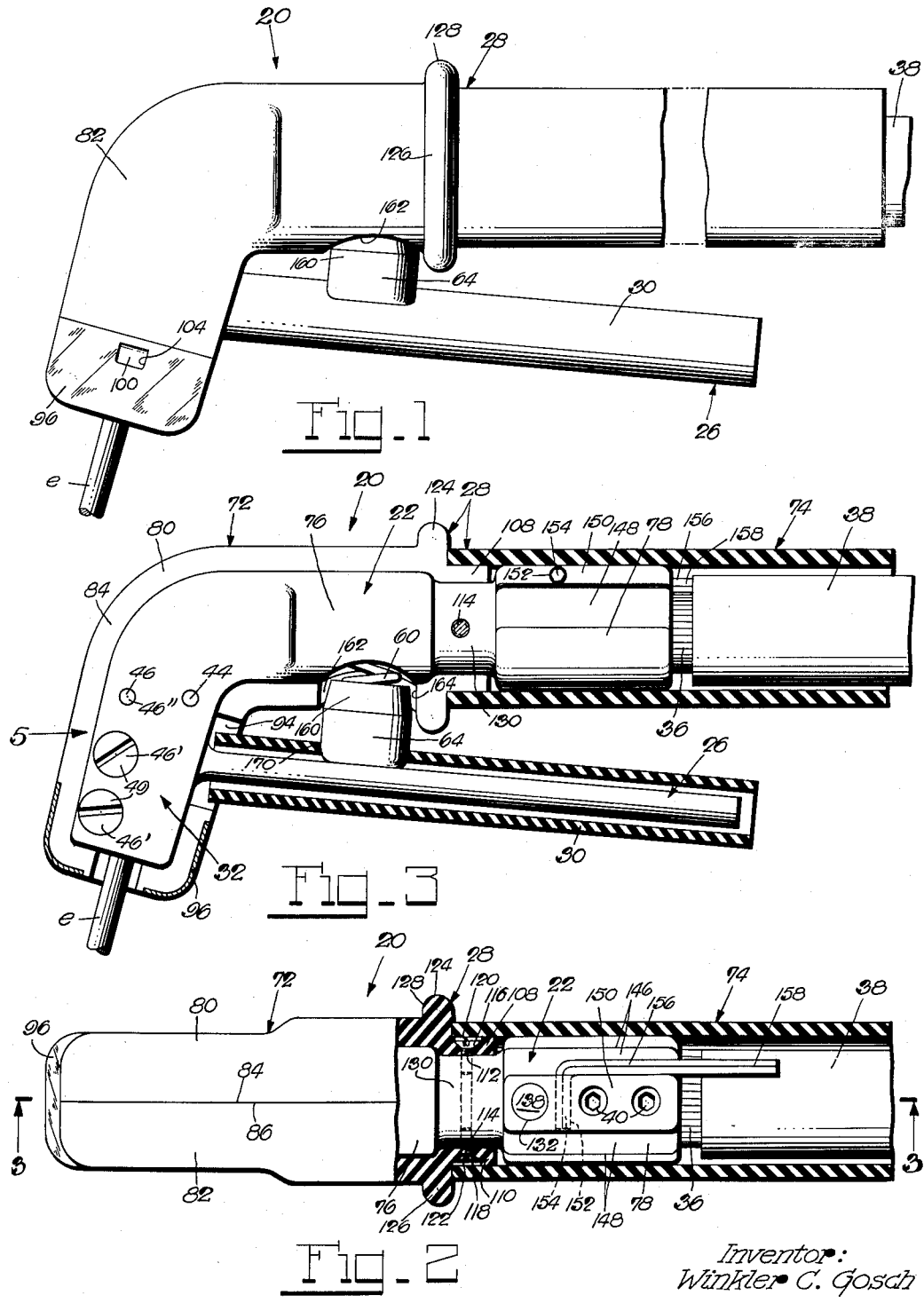

United States Patent Office 2,725,449
Patented Nov. 29, 1955

2,725,449

WELDING ELECTRODE HOLDER

Winkler C. Gosch, Hamden, Conn., assignor to Duro Engineering Company, New Haven, Conn., a partnership Application June 8, 1953, Serial No. 360,258

12 Claims. (Cl. 219—8)

This invention relates to holders for welding electrodes, and more particularly to electrode holders for hand manipulation.

It is an object of the present invention to provide an electrode holder of this type in the form of a convenient handle or grip of simple streamlined shape which may economically be cast with an inclined chuck head that is slotted for the reception of the electrode-gripping jaws entirely within the confines of the slot, thereby to facilitate the application to the handle and its chuck head of a cover or sheath of highly heat-resistant and insulating material, hereinafter referred to as "protective" material, which may conveniently be molded in a simple shape to enhance the streamlined appearance of the holder.

It is another object of the present invention to provide an electrode holder of this type in which the electrode-gripping jaws are releasably mounted in the aforementioned slot in the chuck head of the handle for their ready replacement therein when necessary, and one of these jaws is normally fixed and the other jaw is pivotally mounted and has an operating arm extending alongside the handle and being operable to turn the pivoted jaw for gripping and releasing the electrode.

It is a further object of the present invention normally to urge the pivoted jaw into gripping engagement with the electrode by means of a compression-type spring which is seated with one end in a recess in the handle and with its other end in a cup of protective material which is pinned at its bottom to the jaw arm and extends with its rim into a clearance aperture in the protective handle cover so that the metallic spring is safely out of contact with an operator's hand by which the holder is manipulated.

Another object of the present invention is to apply to the lever arm of the pivoted jaw a cover of protective material in the simple form of a tube which may conveniently be apertured for substantially fitted reception of the pinned bottom of the aforementioned spring cup on the jaw arm and be thereby held securely on the jaw arm.

It is a further object of the present invention to seat also the inner end of the jaw-closing spring in a cup of protective material in the aforementioned recess in the handle so that this spring will be held out of contact with the current-conducting handle as an additional safely measure.

It is another object of the present invention conveniently to form the aforementioned protective cover for the handle in two sections of which a first section is formed in two complemental parts for their ready application to a forward length of the handle and its chuck head, and the other section is in the simple form of a tube which is readily slipped over a rear length of the handle and also for some distance over the adjacent ends of the complemental parts of the first section, and is releasably secured to the handle, thereby also securing the complemental parts of the first cover section in place at their adjacent ends, while a conventional reflector boot on the other ends of these complemental cover parts is releasably interlocked therewith and holds them together.

A further object of the present invention is to secure the aforementioned tubular cover section to the handle by an expansion plug in the latter which is axially forced outwardly into tight clamping engagement with the inner surface of this tubular cover section by means of a driving screw which is threaded into the handle and readily accessible with a screw driver from the outside through an aligned clearance hole in the tubular cover section.

Another object of the present invention is to have the aforementioned driving screw of relatively small size so as to keep the aligned clearance hole in the tubular cover section as small as possible for safety's sake, and to have the aforementioned expansion plug of larger cross-sectional dimension than the screw in order that the plug may have considerable contact area with the tubular cover section for the secure retention of the latter on the handle, without wearing excessively or dangerously into this cover section even after long use.

A further object of the present invention is to arrange the aforementioned driving screw in the handle so that the same is inclined to the axis of the expansion plug, thereby to achieve the additional safety feature of causing the plug to become bound to some extent in the handle and become engaged with the tubular cover section with a non-damaging clamping pressure even when the screw should be driven with an excessive force.

It is another object of the present invention to form the aforementioned fixed jaw in the chuck head of the handle of larger cross-sectional area and of a metal of greater electric conductivity than the pivoted jaw, and to provide for a larger contact area between the fixed jaw and the electrode than between the latter and the pivoted jaw, thereby greatly to reduce, if not substantially avoid, any appreciable resistance heating of the pivoted jaw and heat conductance from there to its lever arm which by virtue of its limited cross-section would otherwise be quickly heated to the point where its protective cover would soon break down and also fail effectively to protect an operator's hand by which the holder is manipulated.

Another object of the present invention is to mount the aforementioned fixed jaw in the chuck head of the handle on a pivot and normally hold it against turning movement from its electrode-gripping position by a screw or screws which are conveniently accessible from the outside of the chuck head, so that on mere removal of the screw or screws the fixed jaw may be swung out of the way of the other jaw and permit the latter to be swung into an abnormal position in which its powerful closing spring may without compression be seated in the aforementioned cup on the jaw arm and be guided with its other end into the other cup in the aforementioned recess in the handle, whereupon the spring may be compressed on simply swinging the jaw arm back toward and beyond its normal position and the latter may be locked against spring-return into the aforementioned abnormal position by the fixed jaw on merely swinging the latter back into its electrode-gripping position and reapplying the screws thereto from the outside of the chuck head, thereby to facilitate the initial assembly of the jaws and jaw-closing spring with the holder, or the replacement of the pivoted jaw or of its closing spring, when necessary.

Further objects and advantages will appear to those skilled in the art from the following, considered in conjunction with the accompanying drawings.

In the accompanying drawings, in which certain modes of carrying out the present invention are shown for illustrative purposes:

Fig 1 is a side view of an electrode holder embodying the present invention;

Fig. 2 is a top view, partly in section, of the electrode holder.

Fig. 3 is a longitudinal section through the electrode holder as taken on the line 3—3 of Fig. 2, with an inner prominent part of the holder shown in elevation;

Fig. 4 is a section similar to Fig. 3, and showing the inner prominent part of the holder also in section;

Fig. 5 is an end view of the inner prominent part of the holder as seen in the direction of the arrow 5 in Fig. 3;

Figs. 6, 7, 8 and 9 are sections taken on the lines 6—6, 7—7, 8—8 and 9—9, respectively, of Fig. 4; and Fig. 10 shows certain prominent parts of the electrode holder, in section, in partly assembled relation.

Referring to the drawings, and more particularly to Figs. 1 to 4 thereof, the reference numeral 20 designates an electrode holder which comprises a handle 22, electrode gripping jaws 24 of which one is provided with an operating arm 26, a protective insulating cover 28 on the handle 22, and a protective insulating sleeve 30 on the jaw operating arm 26.

The handle 22, which is made of any suitable electrically conductive material, is elongated and has at its forward end an inclined head extension 32, referred to hereinafter as "head." The rear end of the handle 22 is provided with a socket 34 which receives the bared end 36 of an insulated conductor 38 and serves as a terminal therefor (Fig. 4). The bared end 36 of the insulated conductor 38 may securely be held in the socket 34 by means of set screws 40 in the handle 22.

The head 32 on the handle 22 is slotted at 42 for the reception of the beforementioned electrode-gripping jaws 24. In the present instance, the jaw 24' is a fixed jaw while the other jaw 24" is a movable jaw, the latter being in this instance pivotally mounted at 44 in the slot 42 for swinging movement toward and away from the fixed jaw 24'. Both jaws 24' and 24" are removably mounted in the slot 42 in the head 32 for their ready replacement when necessary. To this end, the pivot 44 for the movable jaw 24" is removably mounted in the head 32 (Figs. 3 and 4), and the fixed jaw 24' is mounted in the head 32 by a plurality of removable pins 46, in this instance three. For reasons which will become obvious hereinafter, the pins 46' may be screws which are threadedly received in the head 32 and extend through holes 48 in the jaw 24' (Fig. 4). The shanks 47 of the screws 46' may freely extend through, or be threadedly received by, the holes 48 in the jaw 24', whichever is desired, but they are in any event threadedly received by the prong 50 of the slotted head 32 (Figs. 4 and 5). The heads 49 of the screws 46' are preferably flat and flush with the adjacent face of the head 32 (Figs. 3 and 5). The remaining pin 46" is in the form of a pivot pin which is removably mounted in the head 32 and on which the jaw 24' may swing when the screws 46' have been removed therefrom (Fig. 10). In the normal mounted condition of the fixed jaw 24' its electrode-gripping surface 54 faces toward the rear of the handle 22 (Fig. 4) and terminates at a shoulder 56 on the jaw which serves as an inner stop for an electrode e.

The jaw-operating arm 26 is in this instance formed integrally with the movable jaw 24" and extends alongside the handle 22 in a fashion like or similar to that shown in Fig. 4. The movable jaw 24" is normally urged toward its companion jaw 24' by means of a compression spring 60 which is interposed between the handle 22 and the jaw-operating arm 26. For secure anchorage of the spring 60, the handle 22 is provided with a recess 62 and the jaw-operating arm 26 carries a spring retainer 64 which is in the form of a cup and secured with its bottom 66 to the arm 26 by being in this instance pinned thereto as at 68 (Fig. 4). The opposite ends of the spring 60 are received in the retainer cup 64 on the jaw-operating arm 26 and in the recess 62 in the handle 22, respectively. For a reason explained hereinafter, there is preferably placed in the recess 62 in the handle 22 a cup-shaped retainer 70 in which the adjacent end of the spring 60 is seated.

The protective cover 28 on the handle 22 and its head 32 is, in the present instance, formed in two sections 72 and 74 of which section 72 covers the head 32 and a continuing length 76 of the handle 22, while the section 74 covers the remaining or rear length 78 of the handle 22 and extends rearwardly beyond the handle 22 over a substantial length of the insulated conductor 38 (Figs. 2 to 4).

The cover section 72 is, in the present instance, formed of several complemental parts, in this instance of two parts 80 and 82 which, except for their left and right-hand construction, are identical. The complemental cover parts 80 and 82 are of general elbow shape (Figs. 1 to 4) to conform to the shape of the head 32 and the continuing length 76 of the handle 22 which they cover. In applying the complemental cover parts 80 and 82 to the head 32 and continuing length 76 of the handle 22 from opposite sides thereof (Figs. 2 and 6) they combine to form a complete cover which is continuous even at the meeting edges 84 and 86 of these applied cover parts (Figs. 2, 6 and 9). The complemental cover parts 80 and 82 are in the rear of the head 32 provided with complemental notches 90 and 92, respectively, which together define a recess 94 through which the jaw-operating arm 26 with its protective sleeve 30 extends with clearance (Figs. 4 and 9).

The complemental cover parts 80 and 82 receive adjacent the outer end of the head 32 a metal boot 96 that may on opposite sides be provided with punched-out ears 98 and 100 which are simply bent inwardly into recesses 102 and 104 in the cover parts 80 and 82, respectively, for the secure retention of the boot on the latter (Figs. 1 and 6). By the same token, the complemental cover parts 80 and 82 are at the outer end of the head 32 held in place by the metal boot 96. While the metal boot 96 is thus used to good advantage for holding the adjacent ends of the cover parts 80 and 82 in place on the head 32, its primary function is to protect these cover parts from weld spatter and also from the excessive heat from the welding arc at the end of the electrode e. To this end, the outer surface of the metal boot 96 is highly polished or otherwise provided with a mirrorlike surface to serve as a reflector. The other or inner ends 108 and 110 of the cover parts 80 and 82, respectively, may, if desired, be secured by screws 112 and 114 to the handle 22 (Figs. 2 and 7). The heads 116 and 118 of the screws 112 and 114 are preferably received in recesses 120 and 122 in the cover parts 80 and 82, respectively, so as to be located inside the peripheries of the latter.

The other cover section 74 is tubular, and in this instance cylindrical, in order snugly to cover the cylindrical rear length 78 of the handle 22. As previously mentioned, the tubular cover section 74 extends rearwardly beyond the handle 22 and for some distance over the insulated conductor 38. The tubular cover section 74 also extends forwardly into overlapping relation with the adjacent ends 108 and 110 of the complemental parts 80 and 82 of the cover section 72, sufficiently to cover the screws 112 and 114 by means of which the adjacent ends of these cover parts are secured to the handle 22, and in any event sufficiently to hold these adjacent ends 108 and 110 of the complemental cover parts 80 and 82 securely in place on the handle 22 even if they were not secured to the latter by the screws 112 and 114 (Figs. 2 and 7). The complemental parts 80 and 82 of the cover section 72 are adjacent their respective inner ends 108 and 110 provided, in this instance, with peripheral rib formations 124 and 126, respectively, which form an annular rib 128 on the cover section 72 (Figs.

1 to 4, 6 and 7). In order to achieve sightly continuity between the cover sections 72 and 74 on both sides of the annular rib 128 on the former, the inner ends 108 and 110 of the complemental parts 80 and 82 of the cover section 72, which are overlapped by the adjacent end of the tubular cover section 74, are preferably reduced in diameter and located in a diametrically reduced portion 130 of the handle 22 (Figs. 2 to 4).

The complemental parts 80 and 82 of the cover section 72 and the tubular cover section 74 may be of any suitable heat and electrical insulating material, such as a composite material consisting of glass filaments embedded in a resinous compound, for instance.

The rear length 78 of the handle 22 is provided in its periphery with a recess 132 (Fig. 8) the axis of which extends in this instance radially of the handle. Leading into the recess 132 is a tapped hole 134 in the handle 22 which, in the present instance, is of smaller diameter than the recess 132. An end length 136 of the hole 134 is preferably diametrically enlarged. Slidably received in the recess 132 is a plunger 138, and threadedly received in the hole 134 is a driving stud 140 having in its head end a transverse slot 142 for the reception of the bit of a screw driver (not shown) with which to turn the stud 140. To provide for ready access to the stud 140 with a screw driver, the tubular cover section 74 is provided with an aperture 144 in line and continuous with the enlarged end length 136 of the hole 134 in the handle 22 (Fig. 8). On tightening the stud 140 against the plunger 138 by means of a screw driver inserted into the handle 22 through the aperture 144 in the tubular cover section 74 (Fig. 8), the plunger 138 will be forced outwardly into firm engagement with the tubular cover section 74 and securely hold the same in place on the handle 22, as will be readily understood. Conversely, the tubular cover section 74 may readily be removed from the handle 22 on loosening the stud 140 and thereby permitting retraction of the plunger 138 from firm holding engagement with the tubular cover section 74.

The rear length 78 of the handle 22 is at its periphery offset inwardly at 146 and 148 to leave therebetween a projecting longitudinal rib formation 150 (Figs. 2, 3 and 8) which is provided with a transverse hole 152 for the reception of one leg 154 of a conventional Allen-type wrench 156 the other leg 158 of which extends alongside the handle 22 in either one of the inwardly offset peripheral portions thereof, in this instance in the inwardly offset handle portion 146 (Fig. 2). The Allen-type wrench 156 is intended as standard equipment with the present electrode holder and is used for tightening the Allen-type set screws 40 for securing the bared end 36 of the insulated conductor 38 in the socket 34 in the handle 22. When not in use, the Allen wrench 156 is safely and inconspicuously stored away in the fashion shown in Figs. 2 and 3.

It appears from the foregoing description that the cover sections 72 and 74 effectively shield the current-carrying handle 22 and its jaw-carrying head 32 from possible contact with an operator's hand which manipulates the electrode holder anywhere along its handle 22. The current-carrying jaw-operating arm 26 is also effectively shielded from possible contact with an operator's hand by being covered with the protective sleeve 30 which may be made of the same heat and electrical insulating material as the cover sections 72 and 74, and which preferably extends beyond the free end of the jaw-operating arm 26 at one end and into the recess 94 in the cover section 72 at the other end (Fig. 4).

In order to prevent possible contact of the metallic compression spring 60 with an operator's hand, the cup-shaped spring retainer 64 on the jaw-operating arm 26 is preferably made of the same heat and electric insulating material as the cover sections 72 and 74 and its annular rim 160 preferably extends in any operating position of the arm 26 into an aperture 162 formed in the cover section 72 by complemental notches 164 in the parts 80 and 82 thereof (Fig. 4). In order further to avoid any possible contact of an operator's hand with the large welding current flowing through the handle 22, the compression spring 60 itself is preferably insulated from the handle 22 by being seated with its inner end in the previously mentioned retainer cup 70 which is preferably also of the same heat and electric insulating material as the cover sections 72 and 74 and keeps said spring out of contact with the handle 22.

As best shown in Fig. 4, the protective sleeve 30 on the jaw-operating arm 26 is apertured at 170 (Fig. 4) for the reception of the bottom 66 of the spring-retaining cup 64. Accordingly, the fixed bottom 66 of the spring-retaining cup 64 on the jaw-operating arm 26 will, by virtue of its reception in the aperture 170 in the protective sleeve 30, securely hold the latter against accidental or unauthorized axial removal from the arm 26.

The handle 22 and its head 32 are throughout their longitudinal extent of sufficient cross-sectional area to carry the large welding current without becoming appreciably heated. The jaws 24 are of considerably smaller cross-sectional area due to their location in the slot 42 in the head 32. In order to prevent appreciable resistance-heating and, hence, early deterioration of the jaws 24, the fixed jaw 24' is preferably made of a metal of higher electric conductivity than the handle 22. Thus, the handle 22 may, for light-weight purposes, be made of aluminum, for instance, which is a fair electrical conductor, while the fixed jaw may be made of highly conductive copper, for instance. For a reason to be explained presently, it is preferable to make the movable jaw 24'' of a metal which is a poorer conductor than the fixed jaw 24'. Thus, the operating arm 26 for the movable jaw 24'' is necessarily of restricted cross-sectional area in order to indicate immediately by prominent contrast with the much larger handle part that the latter, rather than the jaw-operating arm, is to be grasped for manipulation of the electrode holder. Further, any substantial increase in the diameter of the jaw-operating arm would detract from the sightly streamlined appearance of the electrode holder. Being of restricted cross-sectional area, the jaw-operating arm 26 would quickly be resistance-heated to the point where it would be highly uncomfortable, if not unbearable, to an operator's touch despite the protective sleeve 30 thereon, and the latter would soon deteriorate under the excessive heat. To prevent this, by far the larger part of the welding current is passed through the fixed electrode 24' and only a relatively small part of this current is permitted to pass through the movable jaw 24''. This is accomplished by making the fixed jaw 24' of a metal of greater conductivity than that of the movable jaw 24'', as already explained, and by making the electrode-gripping surface 54 of the fixed jaw of considerably larger contact area than that of the electrode-gripping surface 180 of the movable jaw 24''.

The mounting of the protective cover 28 on the handle 22 in readily removable fashion is highly advantageous not only in assembling the cover with the handle, but also whenever cleaning of both jaws 24 or replacement of either one is indicated. Thus, while the provision of the protective cover 28 in two separate sections 72 and 74 and the further division of the section 72 into the cover parts 80 and 82, as well as the retention of these cover parts on the handle by the metal boot 96 and the overlapping end length of the tubular cover section 74, were heretofore known, the more positive releasable attachment of the inner ends 108 and 110 of the complemental cover parts 80 and 82 to the handle 22 by the screws 112 and 114 whose heads 116 and 118 are shielded by the tubular cover section 74 (Figs. 2 and 7), enhances the safe use of the electrode holder. The assembly of the protective cover 28 with, and its disassembly from the handle 22 are further facilitated, and the safe use of the electrode holder is further enhanced, by the unique releasable plunger connection 138 with the tubular cover section 74 (Figs. 4 and 8). The connection between the plunger 138 and the tubular cover section 74 is especially firm due to the considerable contact area between them. The considerable contact area between the plunger 138 and the tubular cover section 74 is further advantageous from the standpoint of preventing any appreciable wear of the plunger into the material of the cover section even if the stud 140 should be tightened excessively. On the other hand, the driving stud 140 may be of small diameter so as to keep the aperture 144 in the tubular cover section as small as possible for safety's sake. The plunger 138 and driving stud 140, which act like an internal expansion device for drawing the tubular cover section over the greater part of its periphery into firm engagement with the handle 22, permit the tubular cover section to be slid over the handle quickly and without any effort, whereupon this cover section may be mounted on the handle with exceptional firmness by simply driving the stud 140 inwardly in the handle. As shown in Fig. 8, the axis of the tapped hole 134 in the handle 22 is inclined to the axis of the recess 132 therein. While this is advantageous from the viewpoint of hiding the aperture 144 in the tubular cover section 74 from view as much as possible by arranging the same on the bottom side of this cover section without being blocked by the protected jaw-operating arm 26 for ready access with a screw driver, there is a more significant advantage in that only a component of the driving force of the stud 140 forces the plunger 138 outwardly and the latter becomes to some extent bound in its recess 132, with the result that the plunger 138 will not exert an excessive or damaging force on the tubular cover section 74 even if the stud 140 should carelessly be driven inwardly with an excessive force.

The ready assembly of the cover sections 72 and 74 with, and their equally ready disassembly from, the handle 22 has been mentioned before. Assembly of the jaws 24 with, and their disassembly from, the head 32 is also extremely simple. Thus, the jaws 24 may be mounted by simply inserting the pivots 44 and 46" in the head 32 and in the proper aligned holes in the jaws 24" and 24', respectively, and further applying the screws 46' to complete the mounting of the fixed jaw 24'. These jaws may be removed from the head 32 as simply as they may be mounted therein, as will be readily understood. The mounting of the fixed jaw 24' in the head 32 by means of the pivot pin 46" and one or more screws 46' is further advantageous in that on mere removal of the screw or screws 46' from the jaw 24' the latter may be swung about its pivot pin 46" and thereby permit swinging of the movable jaw 24" into the abnormal position in Fig. 10 to permit ready removal of the compression spring 60 in non-compressed condition from its retainers 64 and 70 on the jaw-operating arm 26 and in the handle 22, respectively, and permit equally ready placement of this spring in non-compressed condition in its retainers 64 and 70. After thus placing the non-compressed spring 60 in the retainers 64 and 70, the jaw-operating arm 26 is simply swung toward the handle part of the electrode holder and preferably held against this handle part until the screws 46' have been reapplied to the fixed jaw 24' in its proper gripping position in the head.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In an electrode holder, the combination of an electrically conductive handle having at one end terminal means and at its other end a head provided with an electrode-gripping surface; a jaw pivoted on said head for movement toward and away from said gripping surface and having an operating arm extending alongside said handle; an apertured protective insulating cover on said handle; a protective insulating cup having a bottom and an endless rim and being secured with its bottom to said jaw arm; a compression spring extending into said cover aperture and bearing with one end against said handle and being seated with its other end in said cup for normally urging said jaw against said gripping surface, said cup rim projecting substantially into said cover aperture in any angular position of said jaw and its arm; and a protective insulating sleeve on said jaw arm, said sleeve having an aperture in which said cup is received with its bottom, thereby holding said sleeve against axial removal from said jaw arm.

2. In an electrode holder, the combination of an electrically conductive recessed handle having at one end terminal means and at its other end a head provided with an electrode-gripping surface; a jaw pivoted on said head for movement toward and away from said gripping surface and having an operating arm extending alongside said handle; a protective insulating cover on said handle, said cover having an aperture in alignment with said handle recess; a protective insulating cup having a bottom and an endless rim and being secured with its bottom to said jaw arm; a compression spring seated with its ends in said handle recess and cup, respectively, for normally urging said jaw against said gripping surface, said cup rim projecting substantially into said cover aperture in any angular position of said jaw and its arm; and a protective insulating sleeve on said jaw arm, said sleeve having an aperture in which said cup is received with its bottom, thereby holding said sleeve against axial removal from said jaw arm.

3. In an electrode holder, the combination of an electrically conductive elongated handle having at one end terminal means and at its other end a head slotted longitudinally of said handle; and two jaws in said slot of which one jaw is fixed and has an electrode-gripping surface and the other jaw is pivoted for movement toward and away from said gripping surface and has an operating arm extending alongside said handle, said fixed jaw being made of a material having greater electrical conductivity than the material of said handle and other jaw, and said other jaw having an electrode-gripping surface of considerably smaller area than that of said fixed jaw; and spring means normally urging said pivoted jaw against said fixed jaw.

4. In an electrode holder, the combination of an elongated electrically conductive handle having at one end terminal means and at its other end a head slotted longitudinally of said handle; two electrode-gripping jaws in said slot of which one jaw is fixed and the other jaw is pivoted for movement toward and away from said fixed jaw and has an operating arm extending alongside said handle; a compression spring; means on said handle and jaw arm for releasably retaining thereon the opposite ends, respectively, of said spring while the latter is in compressed condition and interposed between said handle and jaw arm, for urging said pivoted jaw against said fixed jaw; and two pins in said head for mounting said fixed jaw in said slot so that on mounting said fixed jaw on one pin the latter may serve as a temporary pivot on which to swing said fixed jaw out of the way of the other jaw and permit the latter to be swung into an abnormal position in which said spring may in non-compressed condition be interposed between said handle and jaw arm and brought with its ends into retaining relation with said means thereon, thereby to facilitate the mounting of said spring.

5. The combination in an electrode holder as set forth in claim 4, in which said pins are removably mounted in said head to permit also removal of said fixed jaw from said slot.

6. The combination in an electrode holder as set forth in claim 4, in which said one pin is removably mounted in said head, and the other pin is a screw threadedly received in said head, so as to permit also removal of said fixed jaw from said slot.

7. In an electrode holder, the combination of an elongated electrically conductive recessed handle having at one end terminal means and at its other end a head slotted longitudinally of said handle; two electrode-gripping jaws in said slot of which one jaw is fixed and the other jaw is pivoted for movement toward and away from said fixed jaw and has an operating arm extending alongside said handle; spring retaining means on said jaw arm; a pre-loaded compression spring releasably retained with one end on said means and seated with its other end in said handle recess for urging said pivoted jaw against the fixed jaw; and at least two removable pins in said head for removably mounting said fixed jaw in said slot so that on removal of one of said pins the other pin may serve as a temporary pivot on which to swing said fixed jaw out of the way of the other jaw to permit the latter to be swung into an abnormal position in which said spring may in non-compressed condition be brought with one end into retaining relation with said means and be aligned at its other end with said handle recess to facilitate the mounting of said spring and also permit its ready removal from the holder.

8. The combination in an electrode holder as set forth in claim 7, in which the pivot of said other jaw is removably mounted in said head to permit removal of said other jaw from said slot.

9. In an electrode holder, the combination of an elongated electrically conductive handle having a transverse hole of which an end length is of larger cross-sectional dimension than the remaining hole length and the latter is threaded; a protective insulating cover on said handle, said cover having an aperture in line and continuous with said remaining hole length in said handle; a plunger slidable in said end length of the hole in said handle; and a stud threadedly received in said remaining hole length and accessible with a tool through said cover aperture for turning said stud to force said plunger into and release it from firm holding engagement with said cover, the axes of said end length and said remaining length, respectively, of said hole being inclined to each other so that said stud applies a component of its driving force to said plunger when the former is tightened in said handle.

10. The combination in an electrode holder as set forth in claim 9, in which the axis of said end length of said hole extends radially of said handle.

11. In an electrode holder, the combination of an elongated electrically conductive handle having terminal means at one end and an inclined jaw-carrying head at the other end, a first length of said handle immediately adjacent said head being of cross-sectionally smaller dimension than the remaining handle length and the latter having a threaded transverse hole; complemental protective insulating cover sections placed against said head and first length of said handle from opposite sides to form thereon a complete protective cover; a metallic reflector boot over and secured to said complemental cover sections at the outer end of said handle head, thereby holding said cover sections in place at said outer head end; a tubular protective insulating cover on said remaining handle length and extending over the adjacent ends of said cover sections into overlapping engagement therewith to hold them in place on said handle, said tubular cover having an aperture in line and continuous with said hole in said handle; and screw means threadedly received in said hole in the handle and accessible with a tool through said aperture in said tubular cover for turning said screw means to force the latter into and release it from firm holding engagement with said tubular cover.

12. The combination in an electrode holder as set forth in claim 11, further comprising headed screws extending through said adjacent ends of said cover sections, respectively, and threadedly received in said handle, the heads of said screws being covered by said overlapping extension of said tubular cover.

References Cited in the file of this patent

UNITED STATES PATENTS

| | | |
|---|---|---|
| 2,236,372 | Kotchi et al. | Mar. 25, 1941 |
| 2,375,656 | Jackson | May 8, 1945 |
| 2,401,523 | Townsend | June 4, 1946 |
| 2,411,652 | Garibay | Nov. 26, 1946 |
| 2,428,065 | Cockrill et al. | Sept. 30, 1947 |